(12) United States Patent
Yseboodt et al.

(10) Patent No.: US 9,378,087 B2
(45) Date of Patent: Jun. 28, 2016

(54) METHODS FOR IMPROVED DMX512 COMMUNICATION WHILE MAINTAINING BACKWARDS COMPATIBILITY

(71) Applicant: KONINKLIJKE PHILIPS N.V., Eindhoven (NL)

(72) Inventors: Lennart Yseboodt, Vorselaar (BE); John Brean Mills, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 93 days.

(21) Appl. No.: 14/347,747

(22) PCT Filed: Oct. 4, 2012

(86) PCT No.: PCT/IB2012/055323
§ 371 (c)(1),
(2) Date: Mar. 27, 2014

(87) PCT Pub. No.: WO2013/050954
PCT Pub. Date: Apr. 11, 2013

(65) Prior Publication Data
US 2014/0223268 A1  Aug. 7, 2014

Related U.S. Application Data

(60) Provisional application No. 61/547,085, filed on Oct. 14, 2011, provisional application No. 61/544,301, filed on Oct. 7, 2011.

(51) Int. Cl.
*G06F 11/00* (2006.01)
*G06F 11/10* (2006.01)
(Continued)

(52) U.S. Cl.
CPC ........ *G06F 11/1004* (2013.01); *G06F 11/2257* (2013.01); *H04L 49/103* (2013.01); *H05B 37/0245* (2013.01)

(58) Field of Classification Search
CPC .............................. G06F 11/1004; G06F 11/10
See application file for complete search history.

(56) References Cited

U.S. PATENT DOCUMENTS 4,881,230 A * 11/1989 Clark .................. G06F 11/2257
370/242
5,319,301 A 6/1994 Callahan et al.
(Continued)

FOREIGN PATENT DOCUMENTS

CN  1135273 A  11/1996
CN  101547542 A  9/2009
(Continued)

OTHER PUBLICATIONS

"DMX Should Not Be Used for Pyro/Laser Split From USB to DMX Converter Thread", May 24, 2006, pp. 1-5, www.blue-room.org.uk.
(Continued)

*Primary Examiner* — Esaw Abraham
(74) *Attorney, Agent, or Firm* — Meenakshy Chakravorty (57) ABSTRACT

Disclosed are methods and apparatus for improved backwards compatible DMX communications. In some embodiments, methods and apparatus related to extensions of the DMX protocol enable error detection by enhanced DMX slave devices while maintaining full compatibility with non-enhanced DMX slave devices. The methods and apparatus may utilize a packet checksum byte that is incorporated within a start code packet and that is a checksum of a plurality of bytes in the start code packet. A plurality of bytes within the start code packet may optionally be interleaved according to an interleaving scheme in some variations.

20 Claims, 6 Drawing Sheets

(51) Int. Cl.
 H04L 12/933 (2013.01)
 G06F 11/22 (2006.01)
 H05B 37/02 (2006.01)

(56) References Cited

U.S. PATENT DOCUMENTS

| | | | | |
|---|---|---|---|---|
| 6,166,496 | A * | 12/2000 | Lys | H05B 33/0857 |
| | | | | 315/292 |
| 6,211,627 | B1 | 4/2001 | Callahan | |
| 6,575,201 | B2 * | 6/2003 | Buesgen | D03D 1/0005 |
| | | | | 139/192 |
| 7,024,685 | B1 * | 4/2006 | Foster | E01F 9/0122 |
| | | | | 348/E7.061 |
| 7,394,210 | B2 * | 7/2008 | Ashdown | H05B 33/0842 |
| | | | | 315/291 |
| 7,501,571 | B2 | 3/2009 | Forsman et al. | |
| 8,072,974 | B1 * | 12/2011 | Jain | H04L 49/103 |
| | | | | 370/389 |
| 8,264,172 | B2 * | 9/2012 | Valois | H05B 37/0254 |
| | | | | 315/291 |
| 8,742,688 | B2 * | 6/2014 | Lee | H05B 37/0272 |
| | | | | 315/294 |
| 2006/0273741 | A1 | 12/2006 | Stalker, III | |
| 2010/0084992 | A1 | 4/2010 | Valois et al. | |

FOREIGN PATENT DOCUMENTS

| | | |
|---|---|---|
| CN | 101588221 A | 11/2009 |
| CN | 101699923 A | 4/2010 |
| EP | 2109348 A2 | 10/2009 |
| WO | 2009087537 A2 | 7/2009 |

OTHER PUBLICATIONS

"BSR E1.11, Entertainment Technology—USITT DMX512 Asynchronous Serial Digital", Data Transmission Standard for Controlling Lighting Equipment and Accessories, Chapter 7 on SIP , pp. 1-79, Nov. 23, 1999.

* cited by examiner

METHODS FOR IMPROVED DMX512 COMMUNICATION WHILE MAINTAINING BACKWARDS COMPATIBILITY

TECHNICAL FIELD

The present invention is directed generally to methods and apparatus related to extensions of a communication protocol. More particularly, various inventive methods and apparatus disclosed herein relate to methods and apparatus related to extensions of the DMX communication protocol.

BACKGROUND

The DMX ("Digital Multiplex") communication protocol is a lighting command protocol conventionally employed in the lighting industry for some programmable lighting applications and currently includes the DMX512 and DMX512-A protocols. In the DMX protocol, lighting related instructions may be transmitted to a lighting unit as control data that is formatted into packets including up to 512 bytes of data, in which each data byte is constituted by 8-bits representing a digital value of between zero and 255. These 512 data bytes are preceded by a "start code" byte (typically 0x00).

In the DMX protocol, an individual data byte of the up to 512 bytes in a given packet is intended as a lighting related command for a particular lighting unit. For example, an individual data byte may be intended as a command for a particular "channel" of a multi-channel lighting unit, wherein a digital value of zero indicates no radiant output power for a given channel of the lighting unit (i.e., channel off), and a digital value of 255 indicates full radiant output power (100% available power) for the given channel of the lighting unit (i.e., channel full on). For example, considering for the moment a three-channel lighting unit based on red, green and blue LEDs (i.e., an "R-G-B" lighting unit), a lighting command in DMX protocol may specify each of a red channel command, a green channel command, and a blue channel command as eight-bit data (i.e., a data byte) representing a value from 0 to 255. The maximum value of 255 for any one of the color channels instructs a processor of the lighting unit to control the corresponding light source(s) to operate at maximum available power (i.e., 100%) for the channel, thereby generating the maximum available radiant power for that color (such a command structure for an R-G-B lighting unit commonly is referred to as 24-bit color control). Hence, a command of the format [R, G, B]=[255, 255, 255] would cause the lighting unit to generate maximum radiant power for each of red, green and blue light (thereby creating white light).

Also, for example, all or aspects of an individual data byte may also be intended as a command to control one or more additional aspects of a lighting unit and/or other DMX slave device. For example, one or more data bytes may control pattern, focus, prism, pan, tilt, rotation speed, and/or animation of a lighting unit. Also, for example, one or more data bytes may control a dimming shutter, color wheel, and/or framing lens of a lighting unit. As understood by one of ordinary skill in the art, the DMX protocol may additionally or alternatively be utilized to control other aspects of one or more lighting units and/or other DMX slave devices.

Thus, a given communication link employing the DMX protocol conventionally can support up to 512 different lighting unit channels. A given lighting unit designed to receive communications formatted in the DMX protocol generally is configured to respond to only one or more particular data bytes of the 512 bytes in the packet corresponding to the number of channels of the lighting unit (e.g., in the example of a three-channel lighting unit, three bytes are used by the lighting unit), and ignore the other bytes, based on a particular position of the desired data byte(s) in the overall sequence of the up to 512 data bytes in the packet. To this end, DMX-based lighting units may be equipped with an address selection mechanism that may be manually set by a user/installer to determine the particular position of the data byte(s) that the lighting unit responds to in a given DMX packet.

Certain implementations of the DMX protocol involve use of the protocol outside of its original scope and/or the stretching of the capabilities of the protocol. For example, the DMX protocol is being utilized over a wireless network in some implementations. Also, for example, the DMX protocol is utilized to control lighting units that may put people and/or property at risk in some implementations (e.g., eye damaging laser emitting lighting units utilized around people). In such implementations, and in other implementations of the DMX protocol, it may be desirable to implement error detection and/or correction to improve reliability, functionality, and/or safety of lighting units.

The DMX512 protocol does not provide for error detection. The DMX512-A protocol mentions error detection via use of a System Information Packet (SIP). The SIP has an alternate start code (e.g., not 0x00) and includes checksum data relating to the previous start code packet on the data link, along with other control information. Although the SIP implements some degree of error detection, utilization thereof requires all DMX slave devices to be compatible with the DMX512-A protocol. Also, the checksum included in the SIP is a simple addition checksum that must be sent in a separate packet that includes a large amount of bytes relative to the checksum complexity.

Thus, there is a need in the art to provide methods and apparatus related to extensions of the DMX protocol that enable error detection by enhanced DMX slave devices, that maintain full compatibility with non-enhanced DMX slave devices, and that optionally overcome one or more additional drawbacks of a SIP.

SUMMARY

The present disclosure is directed to inventive methods and apparatus for improved backwards compatible DMX communications. For example, in some embodiments methods and apparatus related to extensions of the DMX protocol enable error detection by enhanced DMX slave devices while maintaining full compatibility with non-enhanced DMX slave devices. The methods and apparatus may utilize a packet checksum byte that is incorporated within a start code packet and that is a checksum of a plurality of bytes in the start code packet. A plurality of bytes within the start code packet may optionally be interleaved according to an interleaving scheme in some variations.

Generally, in one aspect, a method of providing improved DMX communication while maintaining backwards compatibility includes connecting a plurality of enhanced DMX slaves to a DMX network. The enhanced DMX slaves have a plurality of DMX slave control addresses corresponding thereto. The method further includes compiling a DMX start code packet have a plurality of bytes. The bytes include a plurality of enhanced DMX slave instruction bytes corresponding to the enhanced DMX slave control addresses and include at least one packet checksum byte. The packet checksum byte is incorporated within the start code packet and is a checksum of a plurality of the bytes of the start code packet.

The method further includes the steps of transmitting the start code packet on the DMX network; receiving the start code packet at each of the enhanced DMX slaves; buffering a plurality of the bytes including the packet checksum at each of the enhanced DMX slaves; and calculating a received checksum of buffered of the bytes and comparing the received checksum with the packet checksum at each of the enhanced DMX slaves. Each of the enhanced DMX slaves at least selectively acts on a respective at least one of the enhanced DMX slave instruction bytes only when a calculated received checksum and the packet checksum substantially correspond.

In some embodiments the enhanced DMX slave instruction bytes include interleaved DMX slave instruction bytes that may optionally have bits that correspond to operating instructions for a plurality of the enhanced DMX slaves. In some versions of those embodiments the bytes of the DMX start code further include at least one non-interleaved non-enhanced DMX slave instruction byte corresponding to a non-enhanced DMX slave control address.

In some embodiments the method further includes the step of interleaving a plurality of individual bits among the DMX slave instruction bytes according to an interleaving scheme prior to transmitting the start code packet on the DMX network. In some versions of those embodiments the enhanced DMX slave instruction bytes include first, second, and third enhanced DMX slave instruction bytes and each of the first, second, and third enhanced DMX slave instruction bytes includes first enhanced DMX slave instruction bits corresponding to a first of the enhanced DMX slaves and second enhanced DMX slave instruction bits corresponding to a second of the enhanced DMX slaves.

In some embodiments the method further includes the step of transmitting a separate informational packet to the DMX slaves that includes data pertaining to calculating the received checksum.

In some embodiments data pertaining to calculating the received checksum is preloaded onto the enhanced DMX slaves.

In some the packet checksum byte is provided at the end of the start code packet.

In some embodiments the checksum is a checksum of all control instructions of the start code packet.

Generally, in another aspect, a method of providing improved DMX communication while maintaining backwards compatibility includes connecting at least one enhanced DMX slave to a DMX network and connecting at least one non-enhanced DMX slave to the DMX network. The enhanced DMX slave has at least one enhanced DMX slave control address and the non-enhanced DMX slave has at least one non-enhanced DMX slave control address. The method also includes compiling a start code packet have a plurality of bytes. The bytes include at least one enhanced DMX slave instruction byte corresponding to the enhanced DMX slave control address, at least one non-enhanced DMX slave instruction byte corresponding to the non-enhanced DMX slave control address, and at least one packet checksum byte. The packet checksum byte is incorporated within the start code packet and is a checksum of a plurality of the bytes of the start code packet. The method further includes the steps of transmitting the start code packet on the DMX network; receiving the start code packet at the enhanced DMX slave; buffering a plurality of the bytes including the packet checksum at the enhanced DMX slave; and calculating a received checksum of buffered of the bytes and comparing the received checksum with the packet checksum at the enhanced DMX slave. The enhanced DMX slave at least selectively acts on the enhanced DMX slave instruction byte only when the received checksum and the packet checksum substantially correspond. The non-enhanced DMX slave acts on any received non-enhanced DMX slave instruction byte regardless of the packet checksum.

In some embodiments the at least one enhanced DMX slave instruction byte includes a first enhanced DMX slave instruction byte and a second enhanced DMX slave instruction byte.

In some embodiments the enhanced DMX slave only acts on the first enhanced DMX slave instruction byte when the received checksum and the packet checksum substantially correspond but acts on the second enhanced DMX slave instruction byte even when the received checksum and the packet checksum do not substantially correspond. In some versions of those embodiments the method further includes interleaving a plurality of individual bits in the first enhanced DMX slave instruction byte and the second enhanced DMX slave instruction byte according to an interleaving scheme prior to transmitting the start code packet on the DMX network. In some versions of those embodiments the method further includes transmitting a manufacturer specific packet to the DMX slave that includes data pertaining to the interleaving scheme.

In some embodiments the at least one enhanced DMX slave includes a first enhanced DMX slave and a second enhanced DMX slave. In some versions of those embodiments the at least one enhanced DMX slave instruction byte includes first, second, and third enhanced DMX slave instruction bytes and each of the first, second, and third enhanced DMX slave instruction bytes includes first enhanced DMX slave instruction bits corresponding to the first enhanced DMX slave and second enhanced DMX slave instruction bits corresponding to the second enhanced DMX slave.

Generally, in another aspect, a method of receiving and analyzing improved DMX communications includes receiving a start code packet having a plurality of bytes. The bytes include at least one enhanced DMX slave instruction byte corresponding to an enhanced DMX slave and at least one packet checksum byte. The packet checksum byte is incorporated within the start code packet and is a checksum of a plurality of the bytes of the start code packet. The method further includes the steps of buffering a plurality of the bytes including the packet checksum; calculating a received checksum of buffered of the bytes and comparing the received checksum with the packet checksum; and at least selectively acting on the enhanced DMX slave instruction byte only when the received checksum and the packet checksum substantially correspond.

In some embodiments the at least one enhanced DMX slave instruction byte includes an interleaved first enhanced DMX slave instruction byte and an interleaved second enhanced DMX slave instruction byte and the method further includes de-interleaving the first enhanced DMX slave instruction byte and the second enhanced DMX slave instruction byte.

In some embodiments a plurality of the DMX slave instruction bytes are included and the method further includes at least selectively acting on some of the enhanced DMX slave instruction bytes only when the received checksum and the packet checksum substantially correspond and at least selectively acting on other of the enhanced DMX slave instruction bytes even when the received checksum and the packet checksum do not substantially correspond.

Generally, in another aspect, a method of providing improved DMX communication while maintaining backwards compatibility includes compiling a start code packet have a plurality of bytes. The bytes include at least one enhanced DMX slave instruction byte corresponding to an enhanced DMX slave control address, at least one non-enhanced DMX slave instruction byte corresponding to a non-enhanced DMX slave control address, and at least one packet checksum byte. The packet checksum byte is incorporated within the start code packet and is a checksum of a plurality of the bytes of the start code packet. The method further includes transmitting the start code packet on a DMX network.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The DMX512 protocol does not provide for error detection. The DMX512-A protocol mentions error detection via use of a SIP, which implements some degree of error protection, but requires all DMX slave devices to be compatible with the DMX512-A protocol and requires the sending of a separate packet that includes a large amount of bytes relative to the checksum complexity.

Thus, there is a need in the art to provide methods and apparatus related to extensions of the DMX protocol that enable error detection by enhanced DMX slave devices, that maintain full compatibility with non-enhanced DMX slave devices, and that optionally overcome one or more additional drawbacks of a SIP. The methods and apparatus may utilize a packet checksum byte that is incorporated within a start code packet and that is a checksum of a plurality of bytes in the start code packet.

More generally, Applicants have recognized and appreciated that it would be beneficial to provide backwards compatible extensions of the DMX communication protocol.

In view of the foregoing, various embodiments and implementations of the present invention are directed to extensions of a communication protocol.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. For example, throughout the description various embodiments are discussed in combination with certain DMX controlled lighting fixtures that may be configured for certain applications. However, one of skill in the art having had the benefit of the present disclosure will recognize and appreciate that the principles hereof may be implemented in other lighting fixtures that may be configured for other applications and/or in other non-lighting DMX devices. Moreover, descriptions of well-known apparatuses and methods may be omitted so as to not obscure the description of the representative embodiments. Such methods and apparatuses are clearly within the scope of the claimed invention.

Figure 1:
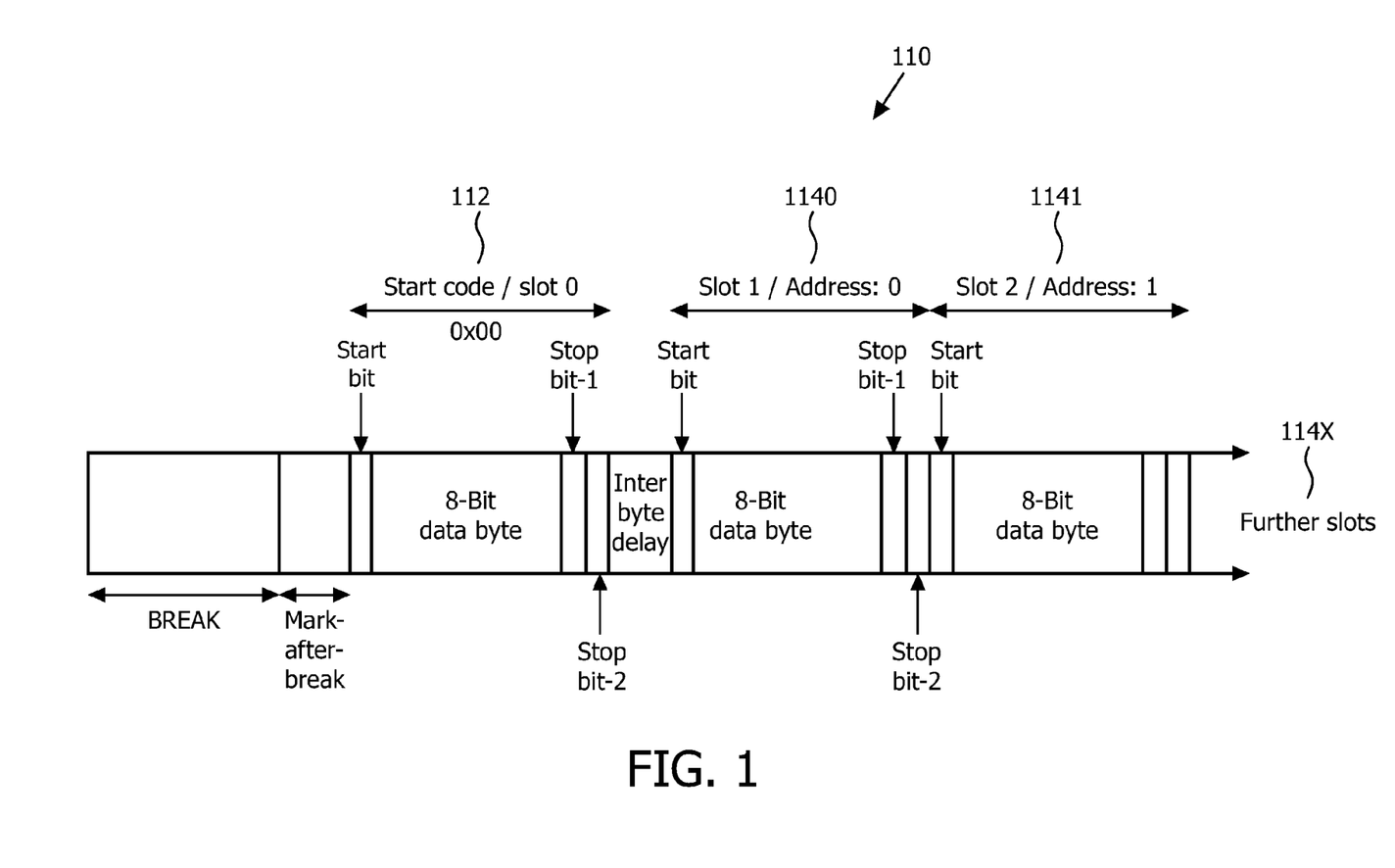
FIG. 1 illustrates beginning portions of an embodiment of a DMX start code packet.

Referring to FIG. 1, beginning portions of an embodiment of a DMX start code packet 110 are illustrated. The DMX start code packet 110 includes a start code 112 having a null value (0x00). The start code 112 follows a reset sequence denoted by "BREAK." The DMX start code packet 110 also includes a plurality of data bytes, including first data byte 1140, second data byte 1141, and other data bytes 114X. A DMX slave device that is configured for address "0" would utilize data transmitted in the first instruction data byte 1140 and a DMX slave device that is configured for address "1" would utilize data transmitted in the second instruction data byte 1141. Optionally, a single DMX slave device may utilize data instruction data bytes 1140 and 1141. Other instruction bytes 114X may include up to 509 additional bytes configured for providing instructions to one or more additional DMX slave devices and/or configured for implementing one or more packet checksum bytes as described herein.

Figure 2:
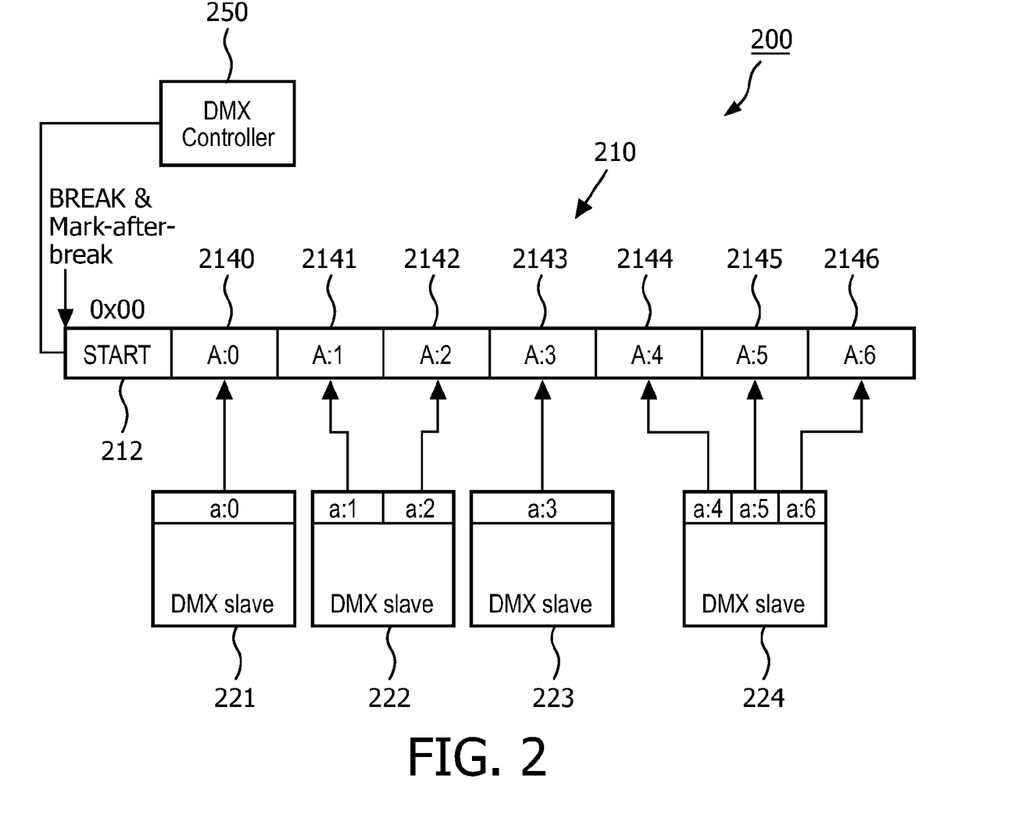
FIG. 2 illustrates an embodiment of a DMX network.

Referring to FIG. 2, an embodiment of a DMX network 200 is illustrated. The DMX network 200 includes a DMX controller 250 transmitting a start code packet 210 to a plurality of DMX slaves 221-224. The start code packet 210 includes a start code 212 and a plurality of data bytes 2140-2146 following the start code 212. The DMX slave 221 is configured to utilize data within instruction data byte 2140. DMX slave 222 is configured to utilize data within instruction data bytes 2141 and 2142. DMX slave 223 is configured to utilize data within instruction data byte 2143. DMX slave 224 is configured to utilize data within instruction data bytes 2144, 2145, and 2146. The DMX controller 250 may optionally implement one or more additional data bytes such as one or more packet checksum bytes as described herein. When one or more packet checksum bytes as described herein are implemented into the start code packet 210 any DMX slave 221-224 that is enhanced to analyze such check sum bytes may do so. Even if one or more of the DMX slaves 221-224 is not enhanced, it will still function normally even when reading instruction bytes from a start code packet that incorporates one or more packet checksum bytes described herein.

Figure 3:
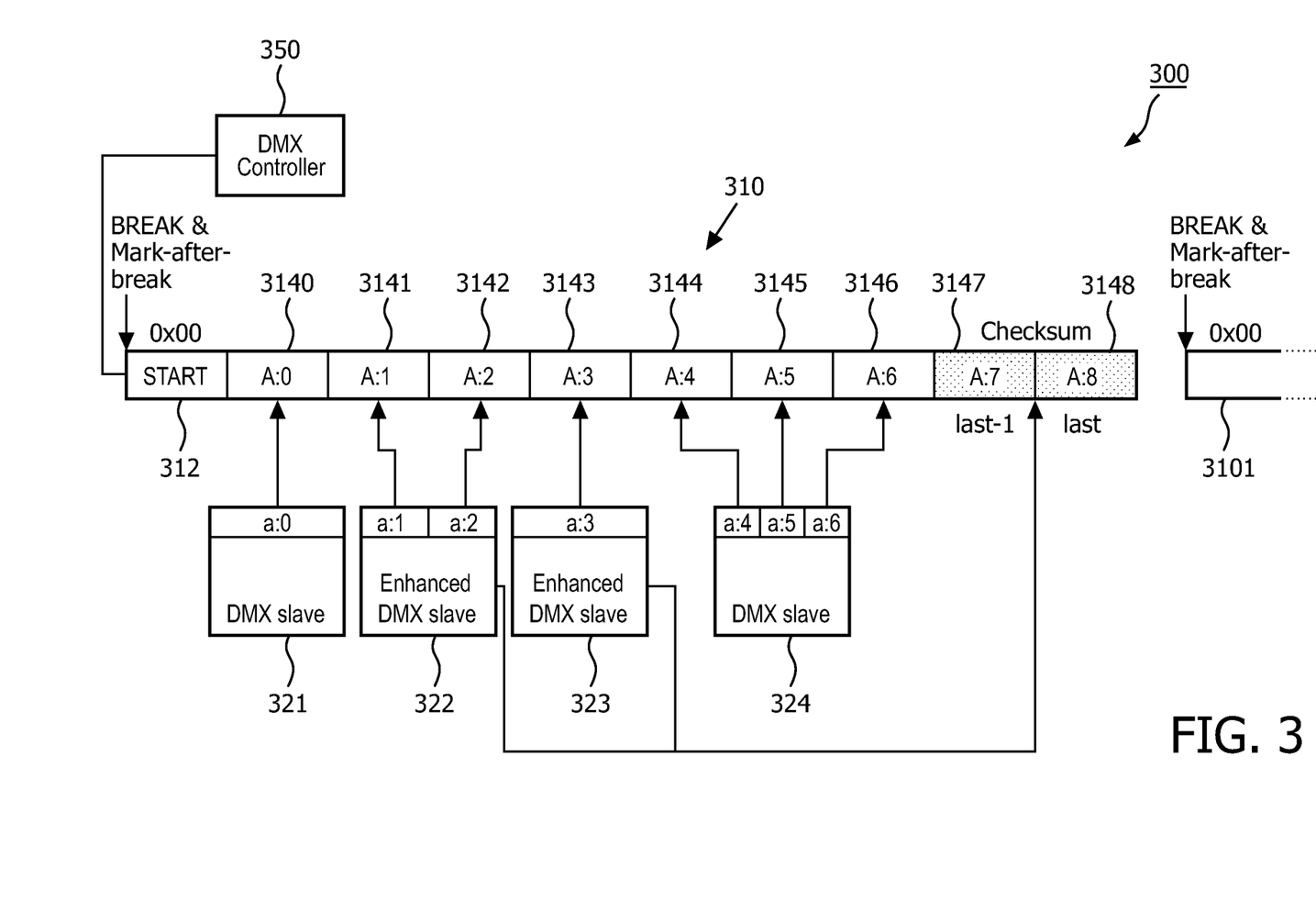
FIG. 3 illustrates an embodiment of a DMX network having enhanced DMX slaves and also having non-enhanced DMX slaves.

Referring to FIG. 3, an embodiment of a DMX network 300 having enhanced DMX slaves 322, 323 and also having non-enhanced DMX slaves 321, 324 is illustrated. The DMX network 300 includes a DMX controller 350 transmitting a start code packet 310 to the DMX slaves 321-324. In some implementations the DMX controller 350 may transmit the start code packet over a communication medium that is subject to noise and interference such as a power line network and/or a wireless network. The start code packet 310 includes a start code 312 and a plurality of data bytes 3140-3148 following the start code 312. The non-enhanced DMX slave 321 is configured to act upon data within instruction data byte 3140. The non-enhanced DMX slave 324 is configured to act upon data within data bytes 3144-3146.

Enhanced DMX slave 322 is configured to act upon data within instruction data bytes 3141 and 3142. Enhanced DMX slave 322 is also configured to buffer and analyze instruction data bytes 3140-3146 and buffer and analyze checksum bytes 3147 and 3148. In one implementation the enhanced DMX slave 322 may buffer instruction data bytes 3140-3146 and calculate a received checksum thereof based upon a predefined checksum algorithm. The enhanced DMX slave 322 may then compare the received checksum with the transmitted master checksum of data bytes 3147 and 3148. If the received checksum corresponds to the master checksum, the DMX slave 322 may then act on the instruction data bytes 3141 and 3142. If the received checksum does not correspond to the master checksum, then the DMX slave 322 may not act on one or both of the instruction data bytes 3141 and 3142. For example, in some embodiments the DMX slave 322 may act on instruction data byte 3141 regardless of the correspondence between the received and master checksums, but only act on instruction data byte 3142 if the received and master checksums correspond. The enhanced DMX slave 323 is configured to act upon data within instruction data byte 3143. Enhanced DMX slave 323 is also configured to buffer and analyze instruction data bytes 3140-3146 and buffer and analyze checksum bytes 3147 and 3148 as described herein. In some implementations the enhanced DMX slave 323 may buffer instruction data bytes 3140-3146, calculate a received checksum thereof, compare it to the master checksum of data bytes 3147 and 3148, and only act on instruction data bytes 3143 when the received checksum and master checksum correspond.

A second start code packet 3101 is also illustrated in FIG. 3 following the first start code packet 310. The second start code packet 3101 may have the same format as the first start code packet 310. Moreover, the enhanced DMX slaves 322 and 323 may likewise buffer data bytes of second start code packet 3101, calculate a received checksum thereof, and compare it to a transmitted master checksum thereof.

Figure 4:
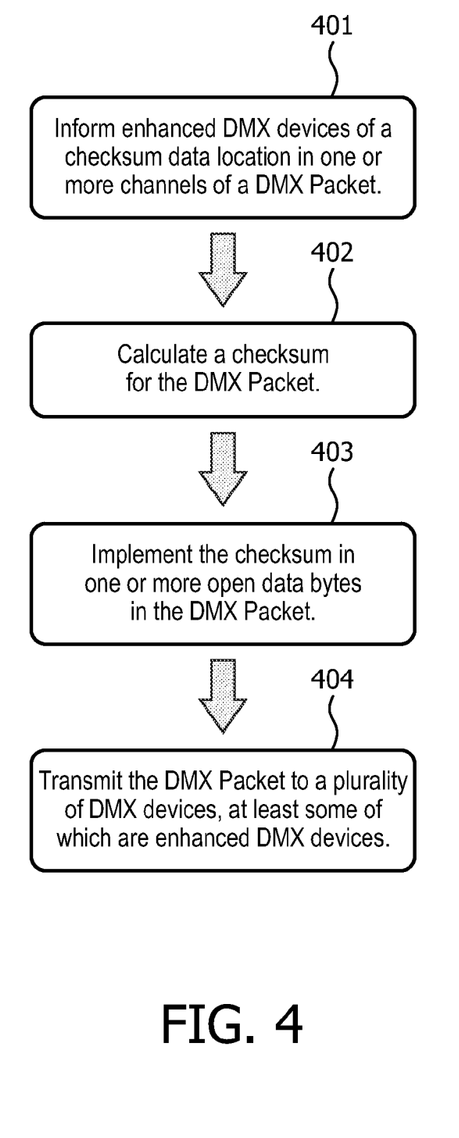
FIG. 4 illustrates an embodiment of compiling and transmitting improved DMX communications while maintaining backwards compatibility.

Referring to FIG. 4, an embodiment of compiling and transmitting improved DMX communications while maintaining backwards compatibility is illustrated. The steps of FIG. 4 may be implemented in, for example, the controllers 250/350 in some implementations of the DMX networks 200/300.

At step 401 enhanced DMX slave devices are informed of a checksum data location in one or more channels of a DMX packet. For example, the enhanced DMX slave devices may be informed that the checksum data location will be in the last two data bytes of a DMX packet. Also, for example, the enhanced DMX slave devices may be informed that the checksum data location will be in one or more particular checksum data bytes, which may be located at the beginning, end, or middle of a DMX packet. The enhanced DMX slave devices may also optionally be informed what format the checksum will take (e.g., what checksum algorithm will be utilized). In some implementations the DMX slave devices may include preloaded data that identifies a fixed location of a checksum data byte within a DMX packet and/or identifies the checksum format. In some implementations the DMX slave devices may include a jumper or other user interface that enables a user to identify a particular location of one or more locations of a checksum data byte within a DMX packet and/or the checksum format. In some implementations a controller may send a SIP that includes data indicating where the checksum will reside within a DMX packet and optionally indicating what format the checksum will take.

At step 402 a checksum is calculated for the DMX packet. In some embodiments the checksum is calculated for all instruction data bytes of the DMX packet. In other embodiments the checksum may be calculated for less than all of the instruction data bytes of the DMX packet. In some embodiments the checksum algorithm may be a position dependent checksum such as, for example, Fletcher's checksum, Adler-32, or a cyclic redundancy check.

At step 403 the checksum is implemented in one or more open data bytes in the DMX start code packet. The open data bytes are those which the DMX slave devices have been informed carry the checksum. In some embodiments the data bytes may be those at the end of the DMX start code packet.

At step 404 the DMX start code packet is transmitted to a plurality of DMX slave devices. At least some of the DMX slave devices are enhanced DMX slave devices and will verify the transmitted master checksum of the DMX packet with a checksum calculated at the enhanced DMX slave device based upon received DMX packet data. Other of the DMX slave devices may be non-enhanced DMX slave devices and will simply ignore the transmitted master checksum since it is transmitted in an open data byte that is not being used by the non-enhanced DMX slave devices.

Figure 5:
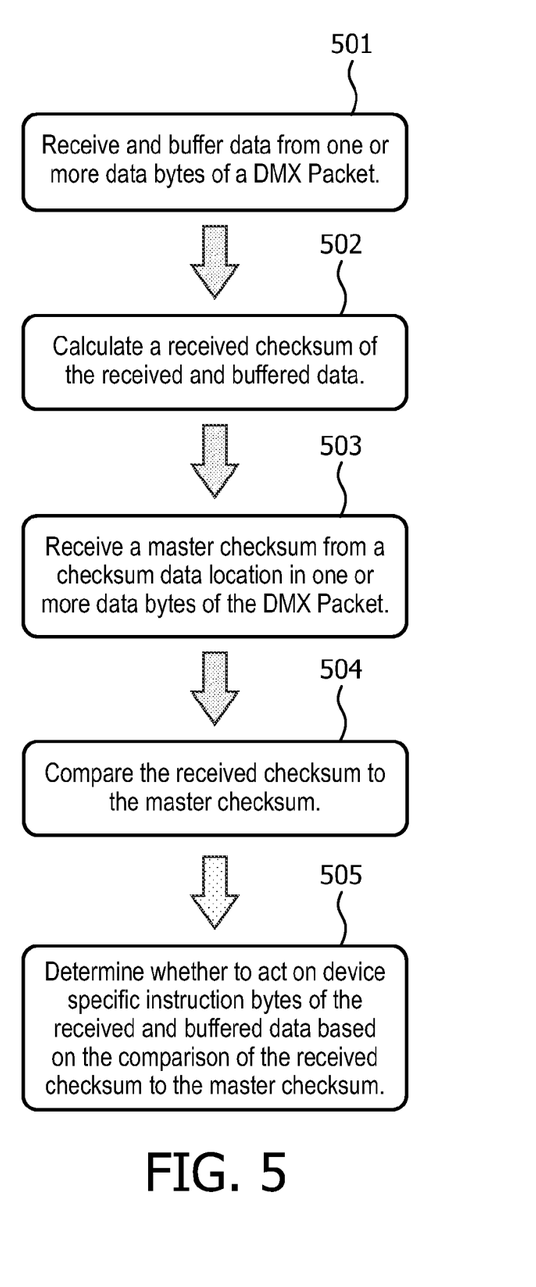
FIG. 5 illustrates an embodiment of receiving and analyzing improved DMX communications.

Referring to FIG. 5, an embodiment of receiving and analyzing improved DMX communications data is illustrated. The steps of FIG. 5 may be implemented in, for example, the enhanced DMX slaves 322, 323 of FIG. 3 in some embodiments.

At step 501, data from one or more data bytes of a DMX start code packet is received and buffered. For example, in some embodiments all instruction bytes of a DMX start code packet are received and buffered.

At step 502, a received checksum of the received and buffered data bytes is calculated according to a checksum algorithm. In some embodiments the algorithm utilized may be dictated, for example, by preloaded data on a DMX slave, transmitted data from a DMX controller, and/or input from a user via a user interface. The calculation of the received checksum may utilize all the received and buffered data (e.g., nearly all DMX start code packet data bytes) in some embodiments and only some parts of the data in other embodiments.

At step 503, a master checksum is received from a checksum data location in one or more data bytes of the DMX start code packet. The particular data bytes that store the master checksum may be dictated, for example, by preloaded data on a DMX slave, transmitted data from a DMX controller, and/or from input from a user via a user interface. In many embodiments step 503 may preferably occur prior to step 502.

At step 504 the received checksum (calculated based on received data bytes) is compared to the master checksum (transmitted in one or more data bytes). At step 505 it is determined whether to act on device specific instruction bytes based upon the comparison of the received checksum to the master checksum. For example, in some embodiments the device specific instruction bytes will not be acted upon unless the received checksum and the master checksum match one another. Also, for example, in some embodiments some data bytes (or aspects thereof) will not be acted upon unless the received checksum and the master checksum match one another while other data bytes (or aspects thereof) will be acted upon regardless. For example, non-critical data bytes may be acted upon regardless of received and master checksum correspondence while critical and/or potentially dangerous data bytes may not be acted upon unless the received and master checksums correspond. Also, for example, in some embodiments the device specific instruction bytes will not be acted upon unless the received checksum and the master checksum are within a predetermined error range of one another. Also, for example, in some embodiments the device specific instructions will be acted upon unless two or more consecutive erroneous DMX start code packets have occurred within a predetermined time period.

Figure 6:
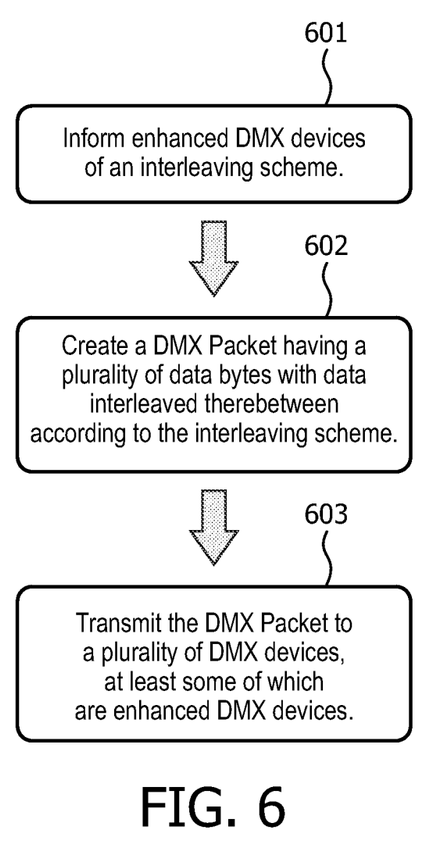
FIG. 6 illustrates an embodiment of a method of compiling and transmitting an interleaved DMX packet.

Referring to FIG. 6, an embodiment of a method of compiling and transmitting an interleaved DMX packet is illustrated. The method of FIG. 6 may optionally be implemented in, for example, the controllers 250/350 in some implementations of the DMX networks 200/300. The method of FIG. 6 may be implemented alone or optionally in combination with the compiling and transmission of a start code DMX packet having checksum data therein.

At step 601 enhanced DMX slave devices are informed of an interleaving scheme. In some implementations the enhanced DMX slave devices may include preloaded data that identifies an interleaving scheme. In some implementations the enhanced DMX slave devices may include a jumper or other user interface that enables a user to identify a particular interleaving scheme. In some implementations a controller may send a SIP that includes data indicating an interleaving scheme.

At step 602 a DMX start code packet is created having a plurality of data bytes with data interleaved therebetween according to the interleaving scheme. For example, referring briefly to FIG. 3, in one embodiment the data of data bytes 3144, 3145, and 3146 may be interleaved with one another. For example, each of data bytes 3144, 3145, and 3146 may include individual bits that are intended for different channels of the DMX slave 324 (instead of each of the data bytes 3144, 3145, and 3146 including bits intended only for a single channel of the DMX slave 324). In some embodiments the interleaving may occur over data bytes that correspond to a plurality of different DMX slave devices. In other words, a single data byte may include data corresponding to a plurality of DMX slave devices. Also, the interleaving may optionally include the checksum data byte(s) in embodiments in which the interleaving is combined with checksum bytes. The interleaving should not occur among data bytes that correspond to any non-enhanced DMX slaves to ensure they receive instructional data bytes as intended.

At step 603, the interleaved DMX start code packet is transmitted to a plurality of DMX slave devices. At least some of the DMX slave devices are enhanced DMX slave devices and will de-interleave the DMX start code packet once received. Other of the DMX slave devices may be non-enhanced DMX slave devices and will simply ignore the interleaved data since it will only be transmitted in data bytes that do not correspond to non-enhanced DMX slave devices.

Figure 7:
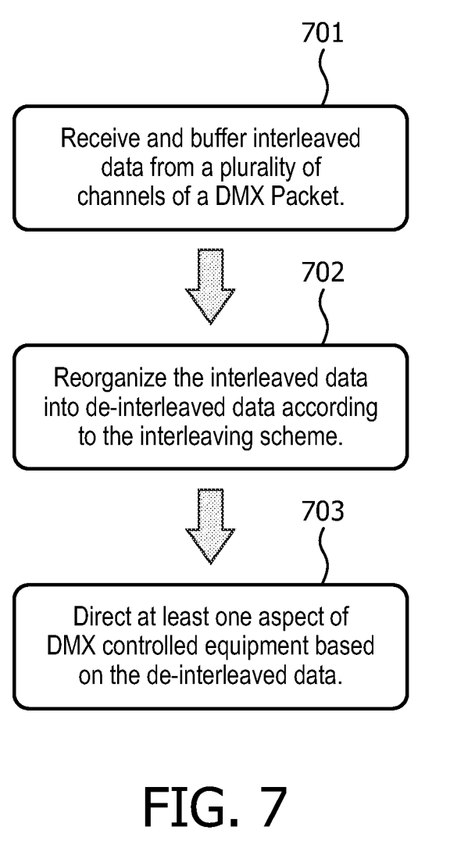
FIG. 7 illustrates an embodiment of a method of receiving and analyzing interleaved data from an interleaved DMX packet.

Referring to FIG. 7, an embodiment of a method of receiving and analyzing interleaved data from an interleaved DMX packet is illustrated. The method of FIG. 7 may be implemented in, for example, the enhanced DMX slaves 322, 323 of FIG. 3 in some embodiments.

At step 701 interleaved data is received and buffered from a plurality of data bytes of a DMX start code packet. For example, the data bytes that are buffered for determining a received checksum may likewise be buffered. At step 702 the interleaved data is reorganized into de-interleaved data according to the interleaving scheme. For example, individual data bits from a plurality of data bytes that correspond to a DMX slave may be reorganized into an order that corresponds to an interleaving scheme to thereby obtain de-interleaved instructions for the DMX slave. The individual data bits may also optionally be de-interleaved to obtain a master checksum if the DMX start code packet includes checksum data and that checksum data has been interleaved. In calculating a received checksum, a DMX slave may utilize the interleaved data in some embodiments and may utilize the de-interleaved data in other embodiments. At step 703 at least one aspect of the DMX controlled equipment corresponding to the DMX slave is directed based on the de-interleaved data.

In embodiments where interleaving is combined with a checksum byte incorporated in the DMX start code packet, it may help minimize the impact of errors in the transmitted DMX start code packet when DMX slave devices determine it is appropriate to utilize one or more data bytes despite the received checksum not matching the master checksum (e.g., if the one or more data bytes are not critical, if the difference between the received checksum and the master checksum indicates minimal corruption, if the erroneous DMX start code packet has not been preceded by additional erroneous packets within a set time period).

Figure 8:
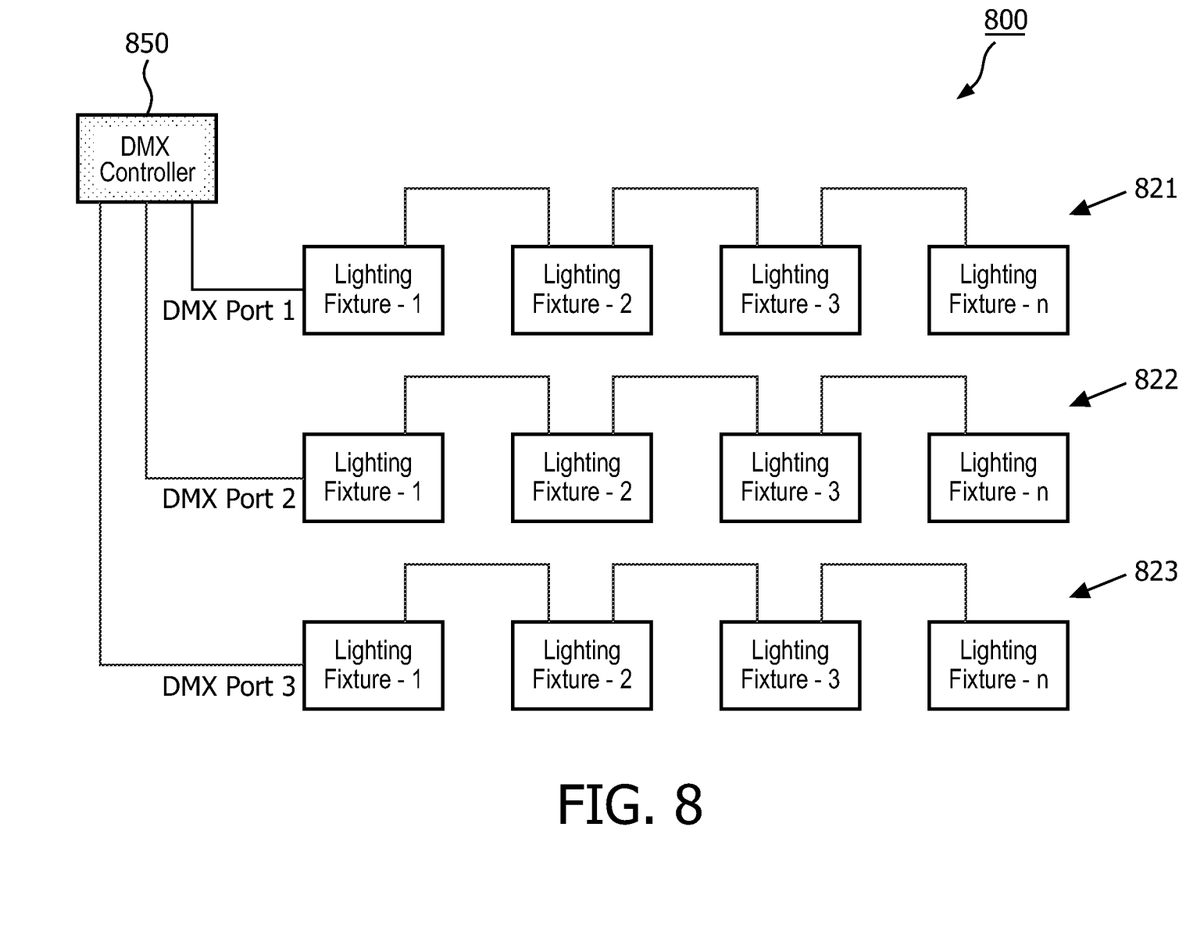
FIG. 8 illustrates another embodiment of a DMX lighting network.

FIG. 8 illustrates another embodiment of a DMX lighting network 800. The DMX lighting network 800 includes a DMX controller 850 controlling three separate groupings of DMX slave lighting fixtures 821, 822, and 823. The DMX controller 850 may send the same DMX start code packet to all three groupings 821, 822, and 823 or may transmit separate DMX start code packets to one or more of the groupings 821-823. For example, the DMX controller may transmit standard DMX512 start code packets to groupings 821, DMX communications implementing a checksum byte in the start code packet to grouping 822, and DMX communications implementing interleaving in the start code packet (optionally in combination with the checksum byte) to groupings 823.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method of providing improved DMX communication while maintaining backwards compatibility, comprising:
    connecting a plurality of enhanced DMX slaves to a DMX network, said enhanced DMX slaves having a plurality of DMX slave control addresses corresponding thereto;
    compiling a DMX start code packet having a plurality of bytes, said bytes including a plurality of enhanced DMX slave instruction bytes corresponding to said enhanced DMX slave control addresses and including at least one packet checksum byte;
    wherein said packet checksum byte is incorporated within said start code packet and is a checksum of a plurality of said bytes of said start code packet;
    transmitting said start code packet on said DMX network;
    receiving said start code packet at each of said enhanced DMX slaves;
    buffering a plurality of said bytes including said packet checksum at each of said enhanced DMX slaves;
    calculating a received checksum of buffered of said bytes and comparing said received checksum with said packet checksum at each of said enhanced DMX slaves;
    wherein each of said enhanced DMX slaves at least selectively acts on a respective at least one of said enhanced DMX slave instruction bytes only when a calculated said received checksum and said packet checksum substantially correspond.

2. The method of claim 1, wherein said enhanced DMX slave instruction bytes include interleaved DMX slave instruction bytes, each of said interleaved DMX slave instruction bytes having bits that correspond to operating instructions for a plurality of said enhanced DMX slaves.

3. The method of claim 2, wherein said bytes of said DMX start code further include at least one non-interleaved non-enhanced DMX slave instruction byte corresponding to a non-enhanced DMX slave control address.

4. The method of claim 1, further comprising interleaving a plurality of individual bits among said DMX slave instruction bytes according to an interleaving scheme prior to transmitting said start code packet on said DMX network.

5. The method of claim 4, wherein said enhanced DMX slave instruction bytes include first, second, and third enhanced DMX slave instruction bytes, wherein each of said first, second, and third enhanced DMX slave instruction bytes includes first enhanced DMX slave instruction bits corresponding to a first of said enhanced DMX slaves and second enhanced DMX slave instruction bits corresponding to a second of said enhanced DMX slaves.

6. The method of claim 1, further comprising transmitting a separate informational packet to said DMX slaves, said separate informational packet including data pertaining to calculating said received checksum.

7. The method of claim 4, wherein data pertaining to calculating said received checksum is preloaded onto said enhanced DMX slaves.

8. The method of claim 1, wherein said packet checksum byte is provided at the end of said start code packet.

9. The method of claim 8, wherein said checksum is a checksum of all control instructions of said start code packet.

10. A method of providing improved DMX communication while maintaining backwards compatibility, comprising:
    connecting at least one enhanced DMX slave to a DMX network, said enhanced DMX slave having at least one enhanced DMX slave control address;
    connecting at least one non-enhanced DMX slave to said DMX network, said non-enhanced DMX slave having at least one non-enhanced DMX slave control address;
    compiling a start code packet having a plurality of bytes, said bytes including at least one enhanced DMX slave instruction byte corresponding to said enhanced DMX slave control address, at least one non-enhanced DMX slave instruction byte corresponding to said non-enhanced DMX slave control address, and at least one packet checksum byte;
    wherein said packet checksum byte is incorporated within said start code packet and is a checksum of a plurality of said bytes of said start code packet;
    transmitting said start code packet on said DMX network;
    receiving said start code packet at said enhanced DMX slave;
    buffering a plurality of said bytes including said packet checksum at said enhanced DMX slave;
    calculating a received checksum of buffered of said bytes and comparing said received checksum with said packet checksum at said enhanced DMX slave;
    wherein said enhanced DMX slave at least selectively acts on said enhanced DMX slave instruction byte only when said received checksum and said packet checksum substantially correspond; and
    wherein said non-enhanced DMX slave acts on any received said non-enhanced DMX slave instruction byte regardless of said packet checksum.

11. The method of claim 10, wherein said at least one enhanced DMX slave instruction byte includes a first enhanced DMX slave instruction byte and a second enhanced DMX slave instruction byte.

12. The method of claim 11, wherein said enhanced DMX slave only acts on said first enhanced DMX slave instruction byte when said received checksum and said packet checksum substantially correspond but acts on said second enhanced DMX slave instruction byte even when said received checksum and said packet checksum do not substantially correspond.

13. The method of claim 12, further comprising interleaving a plurality of individual bits in said first enhanced DMX slave instruction byte and said second enhanced DMX slave instruction byte according to an interleaving scheme prior to transmitting said start code packet on said DMX network.

14. The method of claim 13, further comprising transmitting a manufacturer specific packet to said DMX slave that includes data pertaining to said interleaving scheme.

15. The method of claim 10, wherein said at least one enhanced DMX slave includes a first enhanced DMX slave and a second enhanced DMX slave.

16. The method of claim 15, wherein said at least one enhanced DMX slave instruction byte includes first, second, and third enhanced DMX slave instruction bytes, wherein each of said first, second, and third enhanced DMX slave instruction bytes includes first enhanced DMX slave instruction bits corresponding to said first enhanced DMX slave and second enhanced DMX slave instruction bits corresponding to said second enhanced DMX slave.

17. A method of receiving and analyzing improved DMX communications, comprising:
    receiving a start code packet having a plurality of bytes, said bytes including at least one enhanced DMX slave instruction byte corresponding to an enhanced DMX slave and at least one packet checksum byte;
    wherein said packet checksum byte is incorporated within said start code packet and is a checksum of a plurality of said bytes of said start code packet;
    buffering a plurality of said bytes including said packet checksum;
    calculating a received checksum of buffered of said bytes and comparing said received checksum with said packet checksum; and
    at least selectively acting on said enhanced DMX slave instruction byte only when said received checksum and said packet checksum substantially correspond.

18. The method of claim 17, wherein said at least one enhanced DMX slave instruction byte includes an interleaved first enhanced DMX slave instruction byte and an interleaved second enhanced DMX slave instruction byte and wherein the method further comprises de-interleaving said first enhanced DMX slave instruction byte and said second enhanced DMX slave instruction byte.

19. The method of claim 17, wherein a plurality of said DMX slave instruction bytes are included and further comprising at least selectively acting on some of said enhanced DMX slave instruction bytes only when said received checksum and said packet checksum substantially correspond and at least selectively acting on other of said enhanced DMX slave instruction bytes even when said received checksum and said packet checksum do not substantially correspond.

20. A method of providing improved DMX communication while maintaining backwards compatibility, comprising:
    compiling a start code packet having a plurality of bytes, said bytes including at least one enhanced DMX slave instruction byte corresponding to an enhanced DMX slave control address, at least one non-enhanced DMX slave instruction byte corresponding to a non-enhanced DMX slave control address, and at least one packet checksum byte;
    wherein said packet checksum byte is incorporated within said start code packet and is a checksum of a plurality of said bytes of said start code packet; and
    transmitting said start code packet on a DMX network.

* * * * *